(12) United States Patent
Blackman et al.

(10) Patent No.: US 7,131,214 B1
(45) Date of Patent: Nov. 7, 2006

(54) TAPE MEASURE MOUNTING CLIP

(75) Inventors: William C. Blackman, Raleigh, NC (US); Christopher T. Cluff, Holly Springs, NC (US)

(73) Assignee: Cooper Brands, Inc., Houston, TX (US)

( * ) Notice: Subject to any disclaimer, the term of this patent is extended or adjusted under 35 U.S.C. 154(b) by 18 days.

(21) Appl. No.: 11/106,090

(22) Filed: Apr. 14, 2005

(51) Int. Cl.
*G01B 3/10* (2006.01)
*A45F 5/02* (2006.01)

(52) U.S. Cl. .............................. 33/761; 33/769; 24/3.11

(58) Field of Classification Search ................. 33/755, 33/758, 759, 761, 769, 770; 24/3.11, 3.12, 24/500
See application file for complete search history.

(56) References Cited

U.S. PATENT DOCUMENTS

| | | | |
|---|---|---|---|
| 650,251 A | 5/1900 | Humphrey | |
| 2,280,304 A * | 4/1942 | Schauer | 24/3.11 |
| 3,357,615 A | 12/1967 | Hill | |
| 3,710,423 A | 1/1973 | Zimpleman | |
| 3,956,701 A | 5/1976 | James, Jr. et al. | |
| 4,100,653 A | 7/1978 | Sensabaugh | |
| 4,228,569 A | 10/1980 | Snyder | |
| 4,237,583 A | 12/1980 | Sullivan | |
| 4,277,864 A | 7/1981 | Orson, Sr. | |
| 4,527,334 A * | 7/1985 | Jones et al. | 33/761 |
| 4,536,925 A * | 8/1985 | Boothe et al. | 24/511 |
| 4,656,696 A | 4/1987 | De Montalembert | |
| 4,956,895 A * | 9/1990 | Hayasaka | 24/3.11 |
| 4,976,048 A * | 12/1990 | Blackman | 33/767 |
| 5,016,326 A | 5/1991 | Goldenberg | |
| 5,052,081 A | 10/1991 | Fuehrer | |
| 5,129,126 A | 7/1992 | Huang | |
| 5,379,490 A * | 1/1995 | Wandt et al. | 24/3.11 |
| 5,678,281 A | 10/1997 | Kamp et al. | |
| D386,215 S | 11/1997 | White et al. | |
| 5,711,085 A * | 1/1998 | Adams | 33/768 |
| 6,125,513 A | 10/2000 | Cheraso et al. | |
| 6,149,043 A | 11/2000 | Goto | |
| 6,349,482 B1 * | 2/2002 | Gilliam | 33/767 |
| 6,443,340 B1 | 9/2002 | Chung et al. | |
| 6,502,283 B1 * | 1/2003 | Aguirre | 24/3.11 |
| 6,702,506 B1 | 3/2004 | Iitsuka | |
| 6,718,649 B1 * | 4/2004 | Critelli et al. | 33/761 |
| 2004/0045133 A1 | 3/2004 | Buettell | |
| 2005/0145656 A1 * | 7/2005 | Knight et al. | 224/162 |

FOREIGN PATENT DOCUMENTS

JP 2004012455 A * 1/2004
JP 2005134122 A * 5/2005

* cited by examiner

*Primary Examiner*—R. Alexander Smith
(74) *Attorney, Agent, or Firm*—Coats & Bennett, P.LLC

(57) ABSTRACT

A tape measure includes a novel mounting clip assembly having a distinct lever arm coupled to a base plate for movement about a pivot axis between a closed position and an open position. The lever arm has a first spring-receiving bay on a side generally facing the base plate and disposed rearward of the pivot axis. The base plate has a first fastener-receiving hole therein forward of the pivot axis, a second spring-receiving bay on a side generally facing the lever arm. A spring biases the lever arm to assume the closed position and extends from the first bay to the second bay. A centerline of a mounting hole in the base plate extends through a second hole in the lever arm when the lever arm is in the closed position. A top of a securing fastener is accessible via the second hole. Also, methods of assembly are described.

15 Claims, 5 Drawing Sheets

US 7,131,214 B1

TAPE MEASURE MOUNTING CLIP

BACKGROUND OF THE INVENTION

The present invention is directed generally to tape measures, and more particularly to a means, such as a mounting clip for supporting the tape measure from a structure.

Modern tape measures (or "tape rules") typically include a coiled tape that is spring-biased towards a retracted position. A housing generally surrounds and protects the tape and a retraction spring and includes an opening through which a distal end of the tape extends. During use, the distal end of the tape is pulled away from the housing; when released, the spring pulls the tape back into the housing so that the tape returns to the retracted position.

Typically, such tape measures include some form of mounting clip (e.g., a belt clip) for attaching the tape measure to a belt, the top of a thin wall, or the like. Typically, such belt clips take the form of a single piece of spring-like material formed into a modified "R" shape. Examples of such structures are shown in U.S. Pat. No. 4,527,334. These conventional belt clips are attached to the tape measure's housing by a screw, although other means are known in the art. While such belt clips are convenient from a manufacturing perspective, they are not ideal for all circumstances. For example, it is sometimes cumbersome to "open" such clips without sliding the relevant surface to be mounted to into the clip. That is, the operations of opening and clipping are essentially collapsed into a single step. While convenient for some situations, users sometimes desire to open the clip before sliding the relevant supporting material into the clip, and then close the clip after the supporting material is in place. As such, there remains a need for alternative mounting clips designs.

SUMMARY OF THE INVENTION

In one embodiment, the present invention is directed to a power-return tape measure comprising: a main case housing a retractable tape measure blade; a mounting clip assembly attached to the main case via a fastener; the mounting clip assembly comprising: a base plate; a distinct lever arm coupled to the base plate for pivoting movement about a pivot axis between a closed position and an open position; the lever arm having a proximal actuation end rearward of the pivot axis and a distal engagement end forward of the pivot axis; the distal end disposed closer to the base plate in the closed position than in the open position; the lever arm having a first spring-receiving bay on a side generally facing the base plate and disposed rearward of the pivot axis; the base plate having a first fastener-receiving hole therein forward of the pivot axis, a second spring-receiving bay on a side generally facing the lever arm and disposed between the first hole and the pivot axis; a spring biasing the lever arm to assume the closed position, the spring extending from the first bay to the second bay; the lever arm having a second hole disposed between the pivot axis and the distal end, forward of the pivot axis and forward of the spring; wherein a centerline of the first hole extends through the second hole when the lever arm is in the closed position; wherein the fastener extends through the first hole; and wherein a top of the fastener is accessible via the second hole.

The base plate may further comprise a pair of spaced flanges, and the tape measure may further comprise a pin extending between the flanges and engaging the lever arm, the pin generally lying along the pivot axis. The spring may comprise a leaf spring, such as one with two bends having respective centers of curvature disposed on opposite sides of the spring. The spring may be disposed so as to pass between the pivot axis and the base plate, without wrapping around the pivot axis. The spring advantageously has a first end disposed in the first bay and a second end disposed in the second bay.

In another embodiment, the present invention provides a method of assembling a tape measure comprising: providing a main case having retractable tape measure blade operatively coupled thereto; coupling a distinct lever arm to a base plate for pivoting movement of the lever arm relative to the base plate about a pivot axis between a closed position and an open position; the lever arm having a proximal actuation end rearward of the pivot axis and a distal gripping end forward of the pivot axis; the distal end disposed closer to the base plate in the closed position than in the open position; the lever arm having a first spring-receiving bay on a side generally facing the base plate and disposed rearward of the pivot axis; the base plate having a first fastener-receiving hole therein forward of the pivot axis, a second spring-receiving bay on a side generally facing the lever arm and disposed between the first hole and the pivot axis; the coupling comprising disposing a first end of a spring in the first bay and a second end of the spring in the second bay and thereafter securing the lever arm to the base plate; wherein the lever arm has a second hole disposed between the pivot axis and the distal end, forward of the pivot axis and forward of the spring; and wherein the securing the lever arm to the base plate comprises securing the lever arm to the base plate so that a centerline of the first hole extends through the second hole when the lever arm is in the closed position; biasing, by the spring, the lever arm to assume the closed position; and fastening the base plate to the tape measure housing with a fastener extending through the first hole. The fastening the base plate to the tape measure housing may comprise inserting a tool through the second hole to engage the fastener. The coupling may comprise connecting a pivot pin to the base plate and engaging the pivot pin with the lever arm. The disposing a first end of a spring in the first bay and a second end of the spring in the second bay may comprise disposing the spring relative to the pivot axis so that the spring passes between the pivot axis and the base plate.

In another embodiment, the present invention provides a tape measure comprising: a main case housing a retractable tape measure blade; a clip means attached to the main case for supporting the main case from a suitable external support, the clip means moveable about a pivot axis between a closed position and an open position; the clip means comprising first and second spring-receiving bays disposed on opposite sides of the pivot axis and moveable relative to each other; the clip means comprising a leaf spring entirely disposed closer to the main case than the pivot axis and having ends disposed in the first and second spring-receiving bays; the spring, in the closed position, comprising two bends having respective centers of curvature disposed on opposite sides of the spring; the spring biasing the clip means toward the closed position. The tape measure may further comprise a fastener securing the clip means to the main case. The clip means may further comprise a pin generally lying along the pivot axis.

DETAILED DESCRIPTION OF THE INVENTION

In one illustrative embodiment, the present invention provides a tape measure having a novel mounting clip assembly for supporting the tape measure from a suitable support, such as from a work belt.

Figure 1:
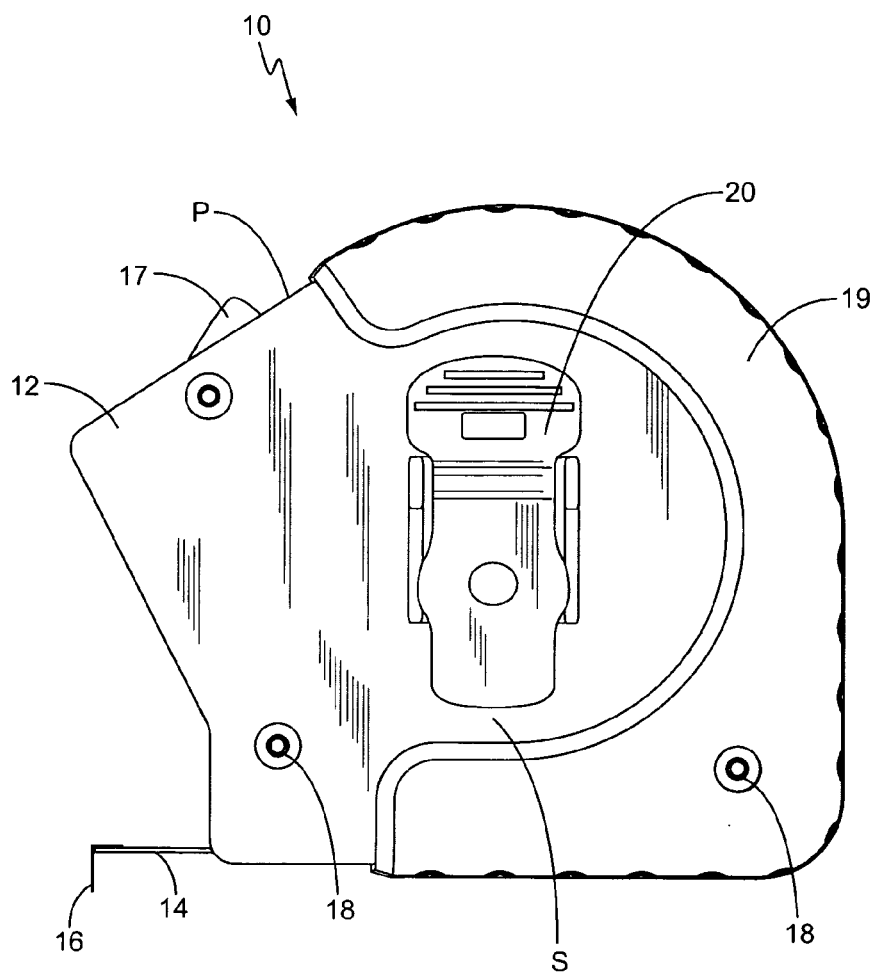
FIG. 1 is a side view of one tape measure embodiment constructed in accordance with the present invention.
Figure 2:
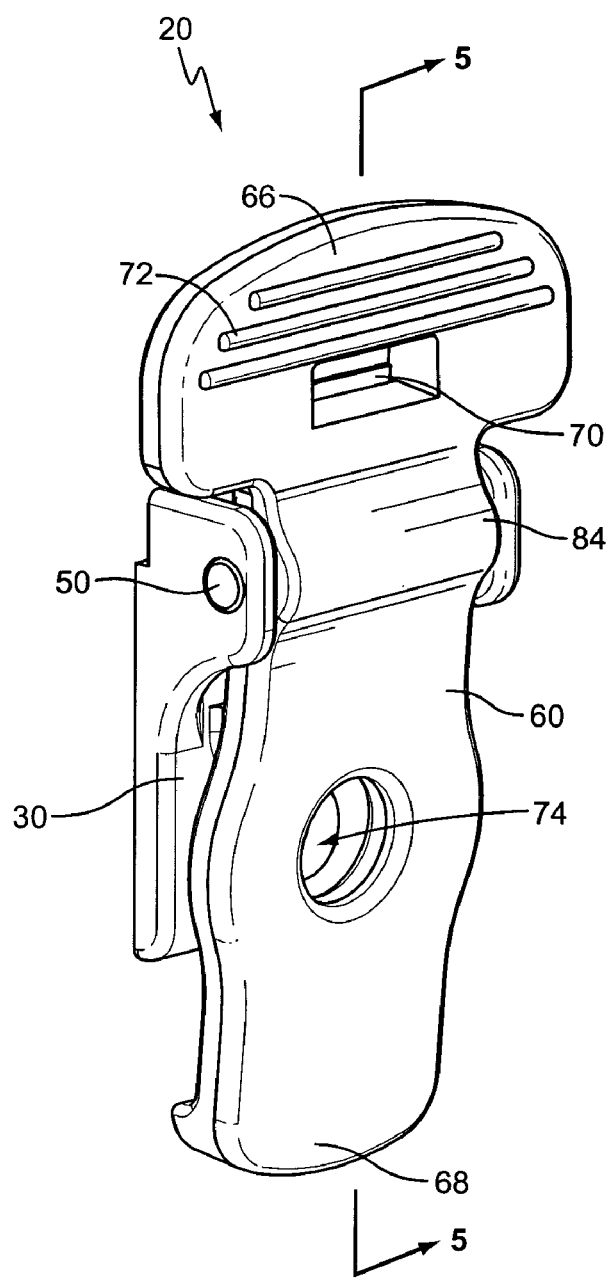
FIG. 2 is a perspective view of one embodiment of a mounting clip assembly in accordance with the present invention.

As illustrated in FIG. 1, a tape measure, generally designated 10, is shown constructed according to the present invention. The tape measure 10 includes a housing 12 with an associated retractable measuring tape or blade 14. The distal end of the tape 14 may advantageously include an end hook 16 to prevent it from being retracted into the housing 12. A tape-biasing device, such as a retraction spring (not shown), is operatively connected to the tape 14 to bias the tape 14 towards a retracted position. A locking mechanism, including a toggle 17 or similar actuator, is provided to aid in controlling the movement of the tape 14 into and out of the housing 12. The housing 12 may be thought of as having sidewalls S and an intervening peripheral wall P, and may be constructed of housing halves secured together, such as by screws 18. An optional grip element 19 may be attached to the housing 12 to increase grip or comfort. A mounting clip assembly 20, sometimes referred to as a belt clip assembly, is attached to a sidewall 1 of the housing 12, as discussed further below. Of course, the tape measures 10 of the present invention may also include other features, such as shock-absorbing bumpers, specially coated blades, reinforcing hooks, various locking mechanisms, and like, all of which are known in the art. As the general design and operation of power-return tape measures are well known in the art, additional detailed discussion is omitted herein for brevity. However, additional discussion may be found in U.S. Pat. Nos. 4,527,334; 4,976,048; and 6,349,482, which are incorporated herein by reference.

Figure 3:
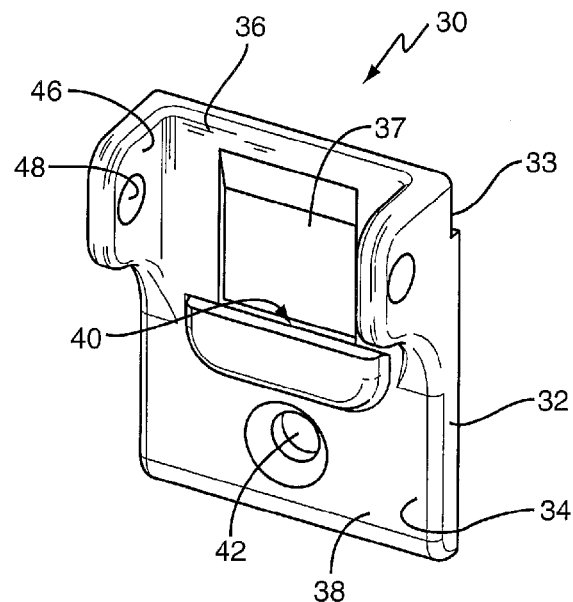
FIG. 3 is a perspective view of one embodiment of a base plate suitable for the present invention.
Figure 4:
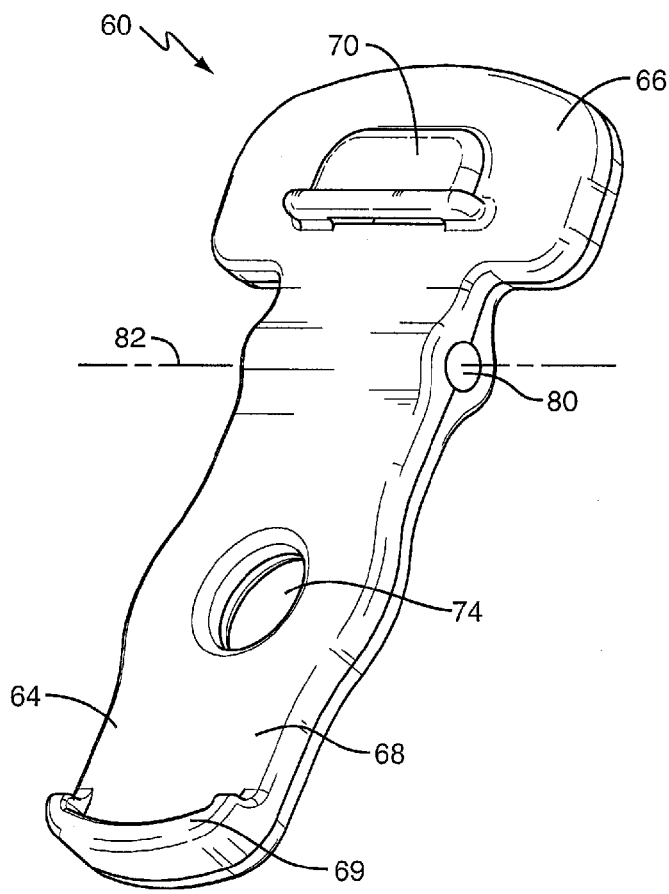
FIG. 4 is a perspective view of one embodiment of a lever arm suitable for the present invention.

The novel mounting clip assembly 20 includes a base plate 30, a lever arm 60, a spring 90, and, in some embodiments, a pivot pin 50. The base plate 30 has a bottom 32, a top 34, a rear or proximal portion 36, a front or distal portion 38, a mounting hole 42, a spring bay 40, and a pair of flanges 46. The bottom 32 is intended to abut against the housing 12 and therefore is advantageously relatively flat. The bottom 32 may include means, such as a small undercut area 33 in the proximal portion 36, to aid in aligning the base plate 30 relative to the housing 12. The top 34 is advantageously relatively flat with a small recessed area 37 disposed between the flanges 46. Adjacent the recessed area 37 is rearwardly opening spring bay 40. Spring bay 40 has an entrance that is advantageously circumferentially surrounded by the material of base plate 30, although the provision for an upper boundary is believed most relevant. Spring bay 40 may be fully enclosed except for the insertion opening to the recessed area 37, but this is not required. Indeed, the base plate 30 of FIG. 3 shows a spring bay 40 that is partially open toward the bottom 32. Spring bay 40 is intended to accept one end 98 of spring 90, as discussed further below. Mounting hole 42 is disposed in distal portion 38, forward of spring bay 40. Mounting hole 42 extends through base plate 30, and may be counter-sunk if desired. Flanges 46 project upward and include appropriate holes 48 for accepting pivot pin 50.

The lever arm 60 is an elongate body having a top 62, a bottom 64, a proximal actuation end portion 66, a distal engaging portion 68, a spring bay 70, and, in some embodiments, a pivot pin passage 80. When viewed from above, the lever arm 60 may have an overall T-shape, although this is not required. The top 62 of lever arm 60 may be generally flat, although there may be a hump 84 overlying the pivot pin passage 80 and texturing (e.g., ribs) in the area 72 pressed by the user to open the mounting clip assembly 20. It may be advantageous for the actuation portion 66 to be angled downward slightly with respect to the gripping end 68, such as by approximately 6°, so as to consume less space. The lower side 64 of the lever arm 60 includes the spring bay 70 in the actuation portion 66 and optionally one or more teeth or prongs 69 on the gripping end 68. The forwardly opening spring bay 70 of lever arm 60 is advantageously essentially an inverted mirror-image of rearwardly opening spring bay 40 of base plate 30. The pivot pin passage 80 extends across the lever arm 60 and is sized to accept the pivot pin 50. The lever arm 60 is coupled to the base plate 30 for pivoting movement about the pivot axis 82, which is advantageously defined by the pivot pin 50. A through hole 74 is disposed along lever arm 60 between pivot axis 82 and the tip of the distal engaging portion 68. As discussed below, through-hole 74 is advantageously generally aligned with the mounting hole 42 of the base plate 30.

The pivot pin 50 couples lever arm 60 to base plate 30. The pivot pin 50 may take the form of a simple cylindrical rod, or a suitable roll pin, or the like. The pivot pin 50 extends from one flange 46 to the other, through the pivot pin passage 80, and supports the lever arm 60 for pivoting motion about pivot axis 82.

The spring 90 biases the lever arm 60 to the closed position. Spring 90 may take the form of a thin leaf-type spring, advantageously with two bends 92,94. The two bends 92,94 are advantageously disposed generally in the middle of the spring 90, and have centers of curvature 92a,94a disposed on opposing sides of the spring 90 so as to cause the spring 90 to curve in opposite directions. Thus, spring 90 has a somewhat flattened "S" or "Z" shape in side profile. The distal end 98 of spring 90 is disposed in spring bay 40 of base plate 30, and the proximal end 96 of spring 90 is disposed in spring bay 70 of lever arm 60. It should be noted that, in extending between the spring bays 40,70, the spring 90 passes between the pivot axis 82 and the base plate 30. Indeed, the spring 90 advantageously lies entirely below a theoretical horizontal plane (not shown) containing the pivot axis 86, so that the entirety of spring 90 is located at a vertical level closer to the bottom 32 of base plate 30 than pivot axis 82.

The mounting clip assembly 20 may be assembled separately and then joined to the tape measure housing 12. The mounting clip assembly 20 may be constructed by inserting the distal end 98 of spring 90 into spring bay 40 on the top 34 of base plate 30. The proximal end 96 of spring 90 is inserted into spring bay 70 on the bottom 64 of lever arm 60. The lever arm 60 is then positioned so that passage 80 is aligned with the holes 48 in flanges 46, and pivot pin 50 is then inserted through holes 48 and passage 80 to pivotally couple lever arm 60 to base plate 30. Spring 90 is thus captured between the two spring bays 40,70, below pivot axis 82. In order to supply some amount of tolerance, it may be advantageous for spring bays 40,70 to be sized slightly longer front-to-back than otherwise required to house the ends 98,96 of spring 90, so as to allow for slack space during assembly and/or operation. Spring 90 acts to push upward against proximal end 66 of lever arm 60, which urges distal end 68 of lever arm 60 down to the closed position.

The mounting clip assembly 20 may then be mated to a tape measure housing 12 by inserting a fastener 100 in mounting hole 42. The fastener 100 may be tightened by a suitable tool 110 (e.g., screwdriver) that extends through hole 74 in lever arm 60 to engage the top 102 of fastener 100. Accordingly, the centerline 44 of mounting hole 42 advantageously passes through hole 74 in lever arm 60 so that the top 102 of fastener 100 may be easily accessed from above. When tightened, fastener 100 holds the base plate 30, and thus the mounting clip assembly 20, against the sidewall S of tape measure housing 12. The fastener 100 may serve only to mate mounting clip assembly 20 to housing 12, or may serve other functions such as also securing an internal post (not shown) to the housing 12 (see U.S. Pat. No. 6,718,649, which is incorporated herein by reference).

Figure 5:
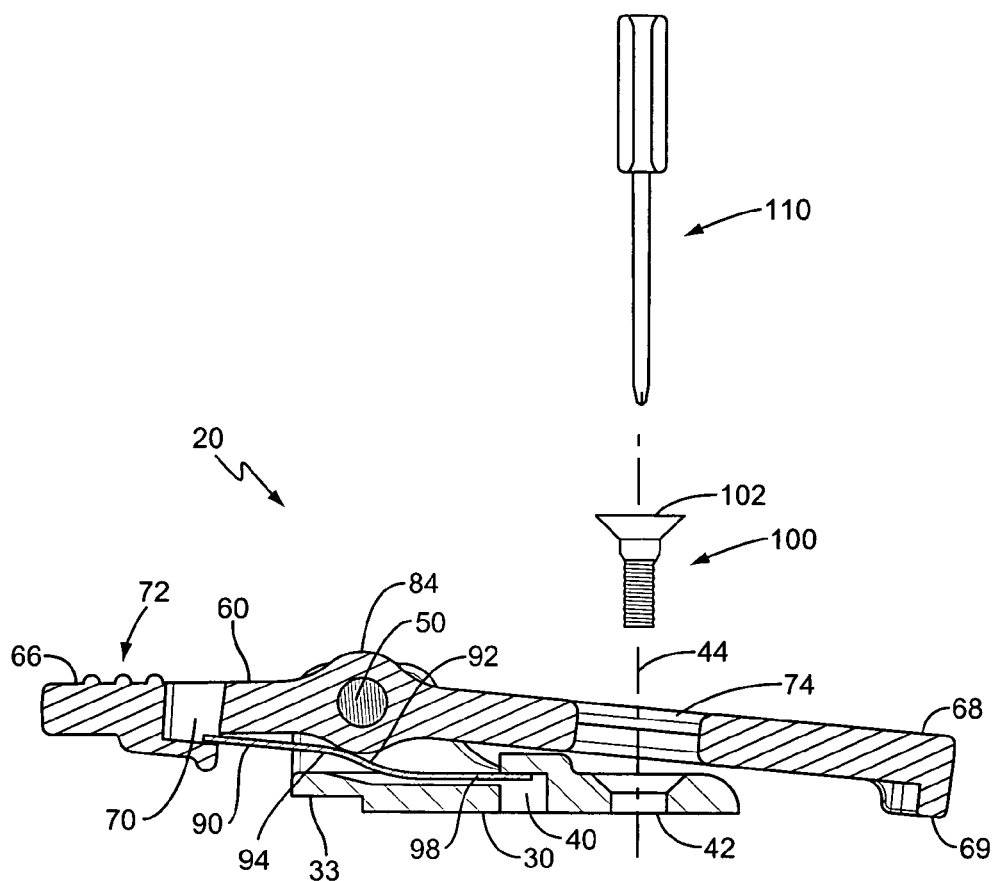
FIG. 5 shows a cross-section view of the mounting clip assembly of FIG. 2 in the closed position.
Figure 6:
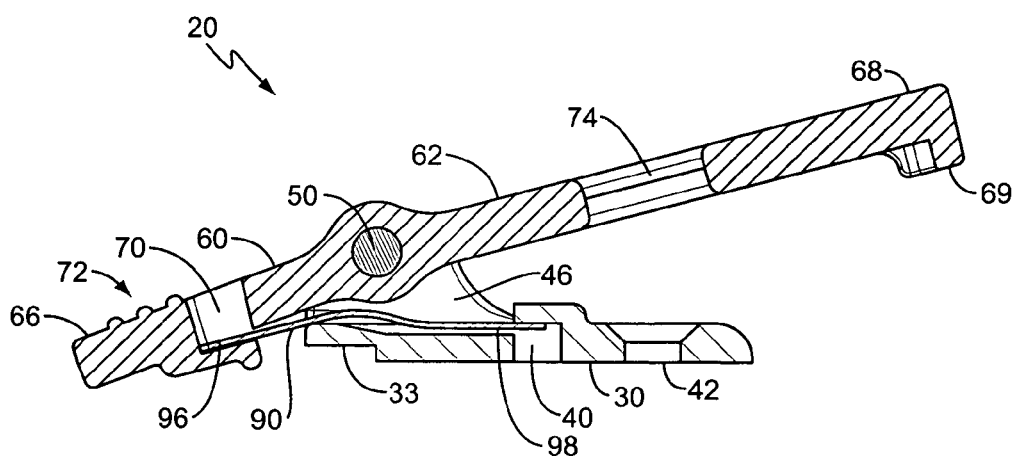
FIG. 6 shows a cross-section view of the mounting clip assembly of FIG. 2 in the open position.
Figure 7:
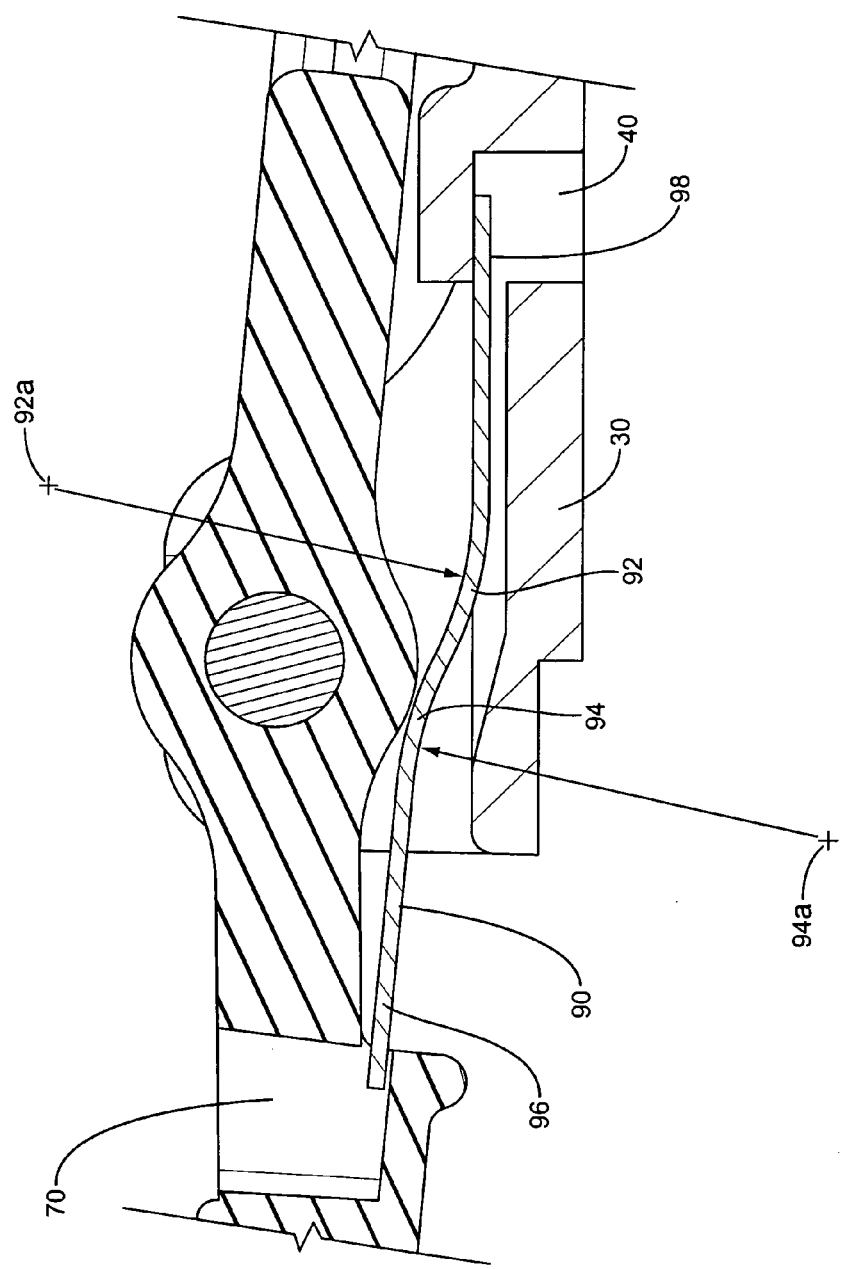
FIG. 7 shows a more detailed view of a portion of the mounting clip assembly of FIG. 5.

In use, the user presses against area 72 of proximal portion 66 of lever arm 60 to overcome the bias of spring 90 and move distal portion 68 of lever arm 60 from the closed position (FIG. 5) to the open position (FIG. 6). The relevant support material (e.g., a work belt, etc.) is inserted in-between the distal portion 68 of the lever arm 60 and the base plate 30 and/or the housing 12. When the user releases the pressure against the lever arm 60, spring 90 urges distal portion 68 of lever arm 60 against the support material, thereby gripping the support material.

For materials, the base plate 30 and the lever arm 60 may be made from a durable material such as a hardened plastic (e.g., ABS, polycarbonate, or the like), while the spring 90 and pivot pin 50 are advantageously metallic.

The discussion above has assumed that a pivot pin 50 is used to couple the lever arm 60 to the base plate 30. However, such is not required in all embodiments. For example, the pivot pin 50 may be replaced by short male pegs and corresponding female recesses on lever arm 60 and base plate 30. The male pegs may be on the flanges 46 of base plate 30 or on the sides of lever arm 60, as is desired. For such an arrangement, the lever arm 60 may be snap-fitted to the base plate 30 during assembly. However, a full length pivot pin 50 is believed to be more robust.

The present invention may, of course, be carried out in other specific ways than those herein set forth without departing from the essential characteristics of the invention. The present embodiments are, therefore, to be considered in all respects as illustrative and not restrictive, and all changes coming within the meaning and equivalency range of the appended claims are intended to be embraced therein.

The invention claimed is:

1. A power-return tape measure, comprising:
    a main case housing a retractable tape measure blade;
    a mounting clip assembly attached to said main case via a fastener; said mounting clip assembly comprising:
        a base plate;
        a distinct lever arm coupled to said base plate for pivoting movement about a pivot axis between a closed position and an open position; said lever arm having a proximal actuation end rearward of said pivot axis and a distal engagement end forward of said pivot axis; said distal end disposed closer to said base plate in said closed position than in said open position;
        said lever arm having a first spring-receiving bay on a side generally facing said base plate and disposed rearward of said pivot axis;
        said base plate having a first fastener-receiving hole therein forward of said pivot axis, a second spring-receiving bay on a side generally facing said lever arm and disposed between said first hole and said pivot axis;
        a spring biasing said lever arm to assume said closed position, said spring extending from said first bay to said second bay;
        said lever arm having a second hole disposed between said pivot axis and said distal end, forward of said pivot axis and forward of said spring;
        wherein a centerline of said first hole extends through said second hole when said lever arm is in said closed position;
    wherein said fastener extends through said first hole; and
    wherein a top of said fastener is accessible via said second hole.

2. The tape measure of claim 1 wherein said base plate further comprises a pair of spaced flanges, and further comprising a pin extending between said flanges and engaging said lever arm, said pin generally lying along said pivot axis.

3. The tape measure of claim 1 wherein said spring, in said closed position, comprises two bends having respective centers of curvature disposed on opposite sides of said spring.

4. The tape measure of claim 1 wherein said spring passes between said pivot axis and said base plate.

5. The tape measure of claim 1 wherein said spring is a leaf spring.

6. The tape measure of claim 1 wherein said spring has a first end disposed in said first bay and a second end disposed in said second bay.

7. The tape measure of claim 1:
    wherein said base plate further comprises a pair of spaced flanges, and further comprising a pin extending between said flanges and engaging said lever arm, said pin generally lying along said pivot axis;
    wherein said spring, in said closed position, comprises two bends having respective centers of curvature disposed on opposite sides of said spring;
    wherein said spring passes between said pivot axis and said base plate;
    wherein said spring is a leaf spring having a first end disposed in said first bay and a second end disposed in said second bay.

8. A method of assembling a tape measure comprising:
    providing a main case having retractable tape measure blade operatively coupled thereto;
    coupling a distinct lever arm to a base plate for pivoting movement of said lever arm relative to said base plate about a pivot axis between a closed position and an open position; said lever arm having a proximal actuation end rearward of said pivot axis and a distal gripping end forward of said pivot axis; said distal end disposed closer to said base plate in said closed position than in said open position;
    said lever arm having a first spring-receiving bay on a side generally facing said base plate and disposed rearward of said pivot axis;

said base plate having a first fastener-receiving hole therein forward of said pivot axis, a second spring-receiving bay on a side generally facing said lever arm and disposed between said first hole and said pivot axis;

said coupling comprising disposing a first end of a spring in said first bay and a second end of said spring in said second bay and thereafter securing said lever arm to said base plate;

wherein said lever arm has a second hole disposed between said pivot axis and said distal end, forward of said pivot axis and forward of said spring; and wherein said securing said lever arm to said base plate comprises securing said lever arm to said base plate so that a centerline of said first hole extends through said second hole when said lever arm is in said closed position;

biasing, by said spring, said lever arm to assume said closed position; and fastening said base plate to said tape measure housing with a fastener extending through said first hole.

9. The method of claim 8 wherein said fastening said base plate to said tape measure housing comprises inserting a tool through said second hole to engage said fastener.

10. The method of claim 8 wherein said coupling further comprises connecting a pivot pin to said base plate and engaging said pivot pin with said lever arm.

11. The method of claim 8 wherein said disposing a first end of a spring in said first bay and a second end of said spring in said second bay comprises disposing said spring relative to said pivot axis so that said spring passes between said pivot axis and said base plate.

12. The method of claim 8:

wherein said coupling further comprises connecting a pivot pin to said base plate and engaging said pivot pin with said lever arm; and wherein said disposing a first end of a spring in said first bay and a second end of said spring in said second bay comprises disposing said spring relative to said pivot axis so that said spring passes between said pivot axis and said base plate.

13. A tape measure, comprising:

a main case housing a retractable tape measure blade;

a clip means attached to said main case for supporting said main case from a suitable external support, said clip means moveable about a pivot axis between a closed position and an open position;

said clip means comprising first and second spring-receiving bays disposed on opposite sides of said pivot axis and moveable relative to each other;

said clip means comprising a leaf spring entirely disposed closer to said main case than said pivot axis and having ends disposed in said first and second spring-receiving bays; said spring, in said closed position, comprising two bends having respective centers of curvature disposed on opposite sides of said spring; said spring biasing said clip means toward said closed position.

14. The tape measure of claim 13 further comprising a fastener securing said clip means to said main case.

15. The tape measure of claim 14 wherein said clip means further comprises a pin generally lying along said pivot axis.

* * * * *